UNITED STATES PATENT OFFICE.

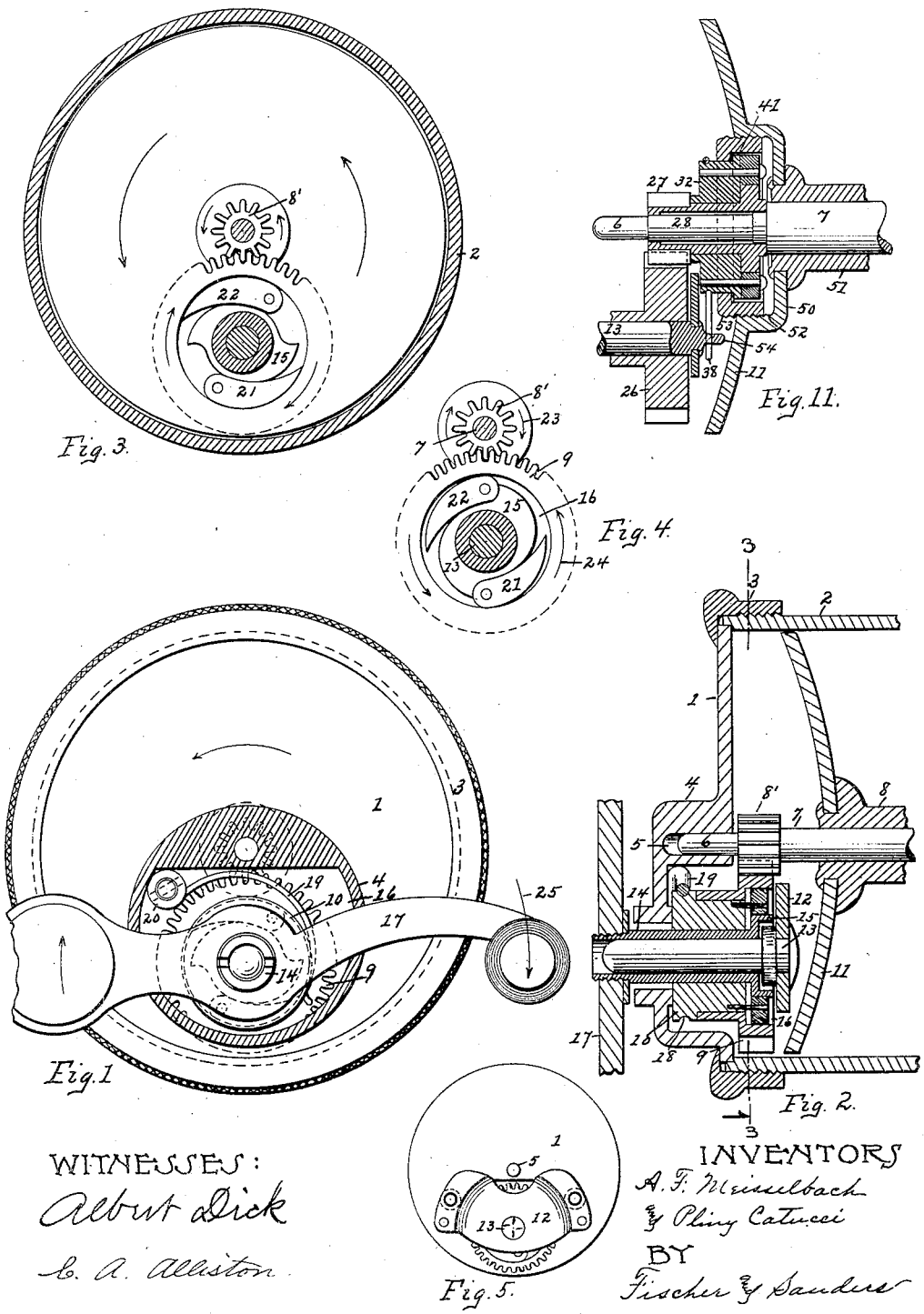

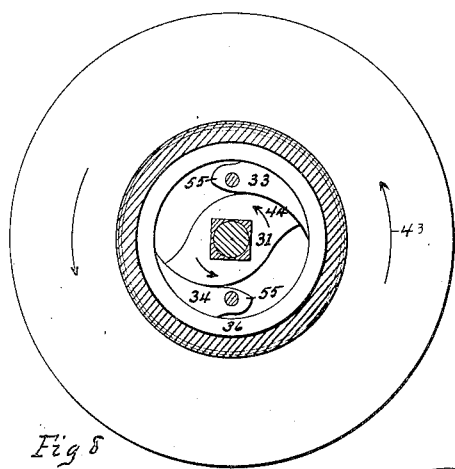
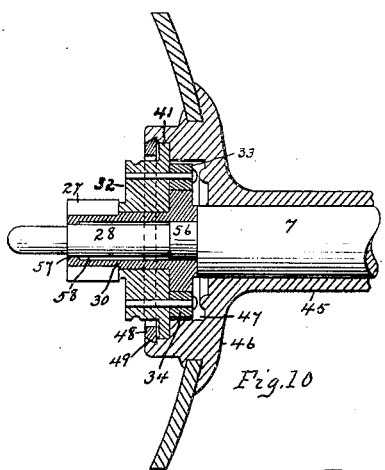
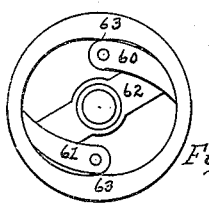
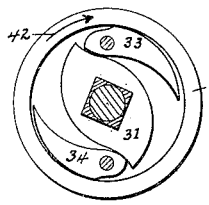
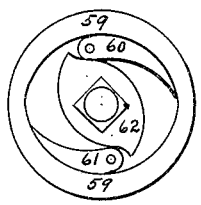
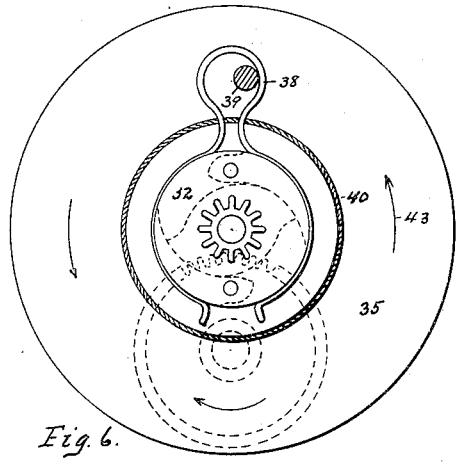
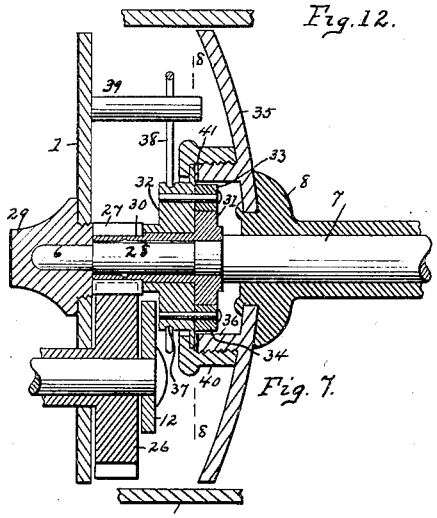
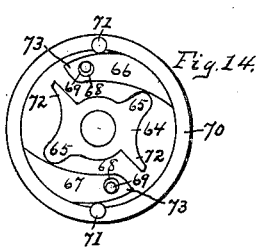

AUGUST F. MEISSELBACH AND PLINY CATUCCI, OF NEWARK, NEW JERSEY, ASSIGNORS TO A. F. MEISSELBACH & BROTHER, OF NEWARK, NEW JERSEY, A CORPORATION OF NEW JERSEY.

FISHING-REEL.

No. 929,867.  Specification of Letters Patent.  Patented Aug. 3, 1909.

Application filed July 31, 1907. Serial No. 386,496.

*To all whom it may concern:*

Be it known that we, AUGUST F. MEISSELBACH and PLINY CATUCCI, citizens of the United States, residing in the city of Newark, in the county of Essex and State of New Jersey, have invented certain new and useful Improvements in Fishing-Reels; and we do hereby declare the following to be a full, clear, and exact description of the same, such as will enable others skilled in the art to which it pertains to make and use the same.

In a fishing reel of the type to which our invention relates, it is desirable to have mechanism of a character which will readily permit the spool to be disconnected from the driving gear, so as to allow of the free paying off of the fish line wound thereon, and yet to positively connect such gear with the spool upon the positive rotation of the crank or handle. It is also desirable, when the spool is freely running that there should be little or no friction to retard or check the free rotation of the spool, and also that the driving gears shall always be in mesh and ready for operation upon the slightest movement of the handle and also to avoid the stripping of the gears when thrown in operation. The mechanism must also be of such a character as to be readily taken apart for cleaning, oiling and inspection. Reels of this character must also be practically noiseless. In the mechanism hereinafter described, we have accomplished all of these objects and provide a structure of a nature requiring little or no attention in operation, very easy of manipulation and yet not liable to disarrangement.

In the accompanying drawings, Figure 1 is a plan view of a head plate of a reel showing a part of the gear case in cross-section. Fig. 2 is a vertical section of the same. Fig. 3 is a sectional view on line 3—3 of Fig. 2. Fig. 4 is a detached view of the reel gears with the clutch inoperative. Fig. 5 is an inner plan view of the reel head plate showing the bridge support for the large gear. Fig. 6 illustrates a modified form in which the clutch mechanism is transferred to the spool head. Fig. 7 is a vertical section of the mechanism illustrated in Fig. 6, showing all of the gears in position. Fig. 8 is a vertical section on line 8—8 of Fig. 7. Fig. 9 is a detached plan view of the clutch case with the clutch inoperative. Fig. 10 illustrates a modified form of spool head, and Fig. 11 illustrates a further modification of the clutch case, as applied to the head of the spool, and Figs. 12, 13 and 14 illustrate further modified forms of clutch mechanism.

Similar numerals of reference refer to like parts throughout the specification and drawings.

In illustrating our improved reel, we have only shown such parts as contain our improvements as applied to any ordinary reel, in which—

1 is the head plate of disk form, held to the frame 2 by means of the flanged head ring 3. The head plate 1 is provided with a drawn boss 4 to form a cavity in the head plate for the reception of the improved mechanism. We also provide in the boss 4 a journal bearing 5 for the pivot 6 of the spool spindle 7, the spool 8 being of any usual or ordinary construction. The spindle 7 carries the small pinion 8' which is at all times in mesh with the driving gear 9, such driving gear being loosely mounted on the bushing 10. The hollow boss 4 opens inwardly to the space between the spool head 11 and the head plate 1, and spanning the cavity within the boss 4 is the bridge piece 12 which carries the central bearing 13 riveted to said bridge 12 as clearly shown in Fig. 5. The bearing 13 carries the sleeve shaft 14 which has at its inner end, the cam shaped clutch member 15, said clutch member resting in the cavity 16 in the inner face of the gear 9. At the outer end of the sleeve shaft 14 is secured the handle 17.

At the outer end of the bushing 10, we provide a circumferential groove 18 to receive the check spring 19, which as illustrated in Fig. 1, is curved around and rests in said groove, the outer end of said spring being held in the head of the boss 4 by means of the screw 20. Between the lobes of the clutch member 15 and the wall of the cavity 16, are the two clutch members 21 and 22, pivoted to the bushing 10. The outer face of the two clutch members 21 and 22 are curved and when in action, bear substantially throughout their length upon the wall of the cavity 16 as clearly illustrated in Fig. 3.

In operation, when the spool 8 upon which the fish line is wound is rotated in a direction to pay off the line, as indicated by the arrows 23, the gear 9 will be rotated in a direction indicated by the arrow 24, in which case, the two clutch members 21 and 22, pressure having been removed therefrom, will permit the gear wheel 9 to revolve freely. However, upon a very slight movement of the handle 17 in the direction of the arrow 25, the clutch member 15 will take the position illustrated in Fig. 3, thereby forcing the clutch members 21 and 22 against the inner wall of the cavity 16 with such force as to immediately check the rotation of the spool 8 and thereby the paying out of the line. Further movement of the handle 17 in the direction of the arrow 25 will immediately wind in the line. Upon the release of the handle 17, any strain upon the line will serve to rotate the spool 8 and with it the pinion 8', as clearly shown by arrows in Fig. 4, thereby releasing the gear 9 from positive connection with the handle 17 through the sleeve shaft 14. In this manner, it will be seen that we have provided a free running spool so long as no pressure is applied to the handle 17 in the direction of the arrow 25, while the slightest movement of the handle in the direction of the arrow 25 will serve to engage the clutch members and stop the running out of the line, while further movement in the same direction will wind in the line.

In Figs. 7, 8 and 9, we have shown our invention as applied to the spool head. In this form, the gear 26 and the handle 17, together with the head 1, are all of the usual type, and secured in the usual manner by means of the bridge 12. Instead, however, of securing the pinion 8' rigidly upon the reel spindle 7, we change the construction and provide a sleeved pinion 27 in mesh with the gear 26, said pinion being mounted loosely upon the reduced end 28 of the spindle 7, the pivot end 6 of the spindle 7 being received into a bearing 29, which is secured to the head plate 1. The sleeve 30 of the pinion 27 is elongated with the clutch member 31 secured upon its inner end in any convenient or desired manner. Between the clutch member 31, and the pinion 27, we mount loosely, the sleeved clutch carrying member 32, as clearly shown in Fig. 9. Upon the inner face of the member 32 we pivot the clutch members 33 and 34, in substantially the same relative position as heretofore described in connection with the clutch members 21 and 22, but inasmuch as the direction of motion of the parts to which the clutch member 31 is connected is reversed, these clutch members 33 and 34, as well as the cam member 31 are oppositely directed. Upon the outer face of the spool head 35, we provide the annular flange 36 for coöperation with the clutch members 33 and 34. The clutch carrying member 32 is provided with a groove 37, which takes therein the looped spring 38, the loop thereof receiving the stud 39 projecting inwardly from the head plate 1, so as to limit the rotation of the spring 38. In order to provide a convenient means for retaining the parts in position, the outer surface of the annular flange 36 is threaded to receive the internally threaded flanged thimble 40, the flange of which overlaps a flange 41 upon the inner end of the clutch carrying member 32. In operation, the running out of the fish line from the spool 8 will cause the rotation of the annular flange 36 in the direction of the arrow 42, the two clutch members 33 and 34 are released from the clutch member 31, in which case, the spool 8 with its spindle 7 revolves freely within the sleeve 30 of the pinion 27 and the driving parts are quiescent. A slight movement, however, of the handle, which in this type of reel is connected to the gear 26, will cause a rotation of the pinion 27, in the direction of the arrow 43, shown in Figs. 7 and 8, but this rotation of the pinion 27 will cause the clutch member 31 to rotate in the direction of the arrow 44 and the lobed ends of such clutch member 31 will bear upon the clutch members 33 and 34, thereby forcing them outwardly against the internal face of the flange 36 and thus rigidly connect the pinion 27 to the spool 8. The rotation of the pinion 27 would under ordinary circumstances, carry with it the clutch carrying mechanism because of the friction between the parts and there would be no gripping of the clutch members 33 and 34 with the interior face of the flange 36. If, however, a slight drag or retardation of the clutch carrying member 32 is afforded, a relative movement is provided for between the clutch member 31 and the clutch members 33 and 34, which is sufficient to cause such clutch members 33 and 34 to engage the interior face of the flange 36. This drag upon the clutch carrying member 32 is afforded by the looped spring 38 carried in the grooves 37 and held from rotation by means of the stud 39.

In Fig. 10, we have illustrated a slight modification of the spool head, so as to permit of the arrangement of the parts forming the clutch mechanism in more compact form. In this case, the spool shank 45 is rigidly secured to the spindle 7 as is the usual custom. The end of the spool shank, however, is enlarged as at 46 and projects toward the head plate to form the cylindrical cavity 47, which receives the clutch members 33 and 34, and the clutch carrying member 32; the pinion 27 and the other parts being substantially as described in connection with Fig. 9. The parts in this case are held in position by means of the split spring ring 48, which is beveled upon its outer face to be received into the undercut annular cavity 49. When in position, the split ring 48 overlaps the flange 41 upon the inner end of the clutch carrying member 32. The operation of this form is substantially the same as heretofore described in connection with the modification illustrated in Fig. 9.

In Fig. 11, we have shown a still further slight modification, the clutch mechanism and gear parts being identical with that illustrated in Figs. 9 and 10, the only difference in the construction residing in the spool head 11, which in this case, is provided with an inwardly extending boss 50, which is secured in the usual manner to the spool shank 51. The inner cylindrical wall of the boss 50 is screw threaded as at 52 to receive the flanged externally threaded thimble 53, the flange of such thimble overlapping the flange 41 upon the inner end of the clutch carrying member 32. In this case, we find that the stud shaft 13 which carries the gear 26 is located in the right position to form a stop for the spring 38, so that we may form a pin projection 54 upon the inner end of the stud shaft 13, which takes into the loop of the spring 38, said spring being received by the groove 37 and the clutch carrying member 32.

In Figs. 8 and 9, it will be noted that the clutch members 33 and 34 have their ends somewhat extended as at 55, so that when the lobes of the clutch member 31 impinge upon the extensions 55, during the reverse movement, the clutch members 33 and 34 will be positively thrown out of engagement with the inner surface of the ring 36. In this manner, any danger of sticking or jamming of the parts is obviated.

In order to reduce the bearing contact between the sleeve 30 and the reduced end 28 of the spool spindle 7 to a minimum, we provide a slightly enlarged portion 56 upon the inner end of the reduced portion 28, making the greater portion of the bore of the sleeve 30 of the same diameter as the enlargement 56. The forward end, however, of the sleeve portion is reduced as at 57 to fit the portion 28 of the spindle. In this manner, the sleeve 30 is provided with two separated bearing points upon the spindle, the greater portion of the sleeve being free from the spindle to provide the oil space 58. In this manner, we are able to reduce the friction between the bearing parts of the modification illustrated in Figs. 7, 10 and 11 to the lowest possible limit.

In Fig. 12, we have shown the inner surface of the clutch ring 59 as slightly elliptical, the clutch members 60 and 61, and also the cam-shaped clutch member 62 are of the same general shape and location as that described in connection with Figs. 4 and 9. In this connection, it will be noted that when the cam member 62 of the clutch is turned in the position illustrated in Fig. 8, the clutch members 60 and 61 will begin to wedge up upon the short diameter of the ring 59, in which position, the parts will be positively locked so long as the cam member 62 bears upon the inner face of the clutch members 60 and 61. In Fig. 13, the same general form is preserved, but the clutch ring is provided with the two inwardly projecting cusps 63 for the same purposes as described in connection with the short diameter of the ring 59 in Fig. 12.

In Fig. 14, we have shown a still further modified form in which the cam member 64 is provided with a pair of diametrically opposite lobes 65, to bear upon the outer ends of the pivoted clutch members 66 and 67. These clutch members 66 and 67 are provided with enlarged apertures 68 which take over the pins 69, so that the pivotal connection between the members 66 and 67 is quite loose upon the pin 69. As a positive bearing point between the ring 70 and the members 66 and 67, we provide the case-hardened steel pins 71, inserted into the inner periphery of the ring 70, so as to project into the path of the members 66 and 67, when the same are projected. In this manner, when the cam 64 is turned with the lobes 65 thereon into contact with the members 66 and 67 as illustrated in Fig. 14, said members 66 and 67 will positively engage the pin 71, and thereby clutch the two parts positively together. Leverage afforded by the lobes 65 against the outer ends of the members 66 and 67 is of such a character, that the said members 66 and 67 cannot pass the pin 71 without rupturing some part of the structure, while when the ring 70 rotates in the opposite direction to carry the members 66 and 67 away from the lobes 65, the parts are perfectly free and should there be a tendency for the parts to stick, the projections 72 will positively engage the rear points 73 of the member 66 and because of the loose pivotal connection, the members 66 and 67 will be positively disengaged from the inner periphery of the ring 70.

It will thus be seen that in all of the modifications which we have shown, we have provided a clutch mechanism in connection with the driving gear for the spool, which clutch mechanism is inoperative to check the rotation of the spool when the fish line is running out and the handle 17 is released, while at the same time, the slightest movement of the handle in "the winding up direction" serves to engage the clutch mechanism, and operate the driving gear to wind in the line.

We claim:

1. In a fishing reel, the combination of a spindle having a spool rigidly mounted thereon and normally free-running in one direction, a pinion mounted upon the spindle of said spool, a gear wheel engaging said pinion, a crank or handle for driving said gear wheel in one direction only, an automatic friction clutch interposed between said gear wheel and said spool, means connected with said clutch for instantly and positively setting the same upon the rotation of the crank or handle in the wind-up direction.

2. In a fishing reel, the combination of a normally free-running spool, a pinion loosely connected with said spool and a gear wheel meshing with said pinion, automatic friction clutch mechanism for positively connecting said pinion to said spool for driving the same in one direction and for automatically releasing said pinion from said spool to permit the same to run freely in either direction.

3. In a fishing reel, the combination of a free running spool, a spindle upon which said spool is rigidly mounted, a pinion loosely mounted upon said spindle and automatic friction clutch mechanism between said pinion and said spool to rigidly connect them to rotate together in one direction and to permit them to rotate independently in opposite directions.

4. In a fishing reel, the combination of a reel frame, and a spool mounted therein, driving gear for rotating said spool in one direction, automatic friction clutch mechanism for positively connecting said spool with said gear upon rotation of the driving gear and for releasing said spool from said gear when said gear is quiescent.

5. In a fishing reel, the combination of a reel frame, a normally free-running spindle mounted therein, a spool rigidly mounted upon said spindle, a pinion sleeved upon the spool spindle, automatic friction clutch mechanism between said pinion and said spool for positively connecting said spool and said pinion during the winding-up operation and to disconnect said spool from said pinion when said pinion is quiescent.

6. In a fishing reel, the combination of a reel frame, a normally free-running spool mounted therein, a pinion having an elongated sleeve thereon loosely mounted upon the spindle of said spool, a clutch member rigidly secured to the free end of said sleeve, a suitably mounted clutch member located within the path of said first named clutch member and a ring element upon said spool member for coöperation with said last named clutch member.

7. In a fishing reel, the combination of a reel frame, a head plate, and a spindle having a spool rigidly mounted thereon, said spool rotatably mounted in said head plate, a pinion loosely mounted on said spindle, automatic friction clutch mechanism between said pinion and the head of said spool actuated by the rotation of said pinion in one direction to cause the rotation of said spool in the same direction and to free said pinion from said spool when the rotation of said pinion ceases, and the strain on said spool continues.

8. In a fishing reel, the combination of a reel frame, a head plate, and a spool having a spindle rotatably mounted in said head plate, a pinion loosely mounted on said spindle, said pinion being provided with a sleeved extension, a clutch member rigidly mounted on said extension, a clutch carrying member loosely mounted on said extension, a pair of clutch members pivotally mounted on said carrying member for engagement with said first named clutch member and a clutch ring rigidly connected with the head of said spool, whereby the rotation of said pinion will automatically set said clutch members to rigidly connect said pinion and spool together.

9. In a fishing reel, the combination of a reel frame and a spool rotatably mounted therein, a clutch ring secured to the head of said spool, a pair of clutch members mounted adjacent to and normally disengaged from said ring and means connected with the reel driving gear to cause said clutch members to positively engage said ring.

10. In a fishing reel, the combination of a reel frame and a spool rotatably mounted therein, a clutch ring having a non-circular clutch face secured to the head of said spool, a pair of pivoted clutch members mounted for engagement with said non-circular clutch ring face and means connected with the reel driving gear to set said clutch members and clutch ring into positive engagement.

11. In a device of the class described, the combination of a rotatable member, a clutch ring having a non-circular clutch face secured to said rotatable member, a pair of pivoted clutch members mounted for engagement with said non-circular clutch ring face and means connected with said pivoted clutch members to set the same and the clutch ring into positive engagement.

This specification signed and witnessed this 23d day of July 1907.

AUGUST F. MEISSELBACH.
PLINY CATUCCI.

Witnesses:
  L. M. SANDERS,
  C. A. ALLISTON.